No. 896,287.  
PATENTED AUG. 18, 1908.  
J. FELT.  
ROD PACKING.  
APPLICATION FILED MAY 23, 1908.  
2 SHEETS—SHEET 1.
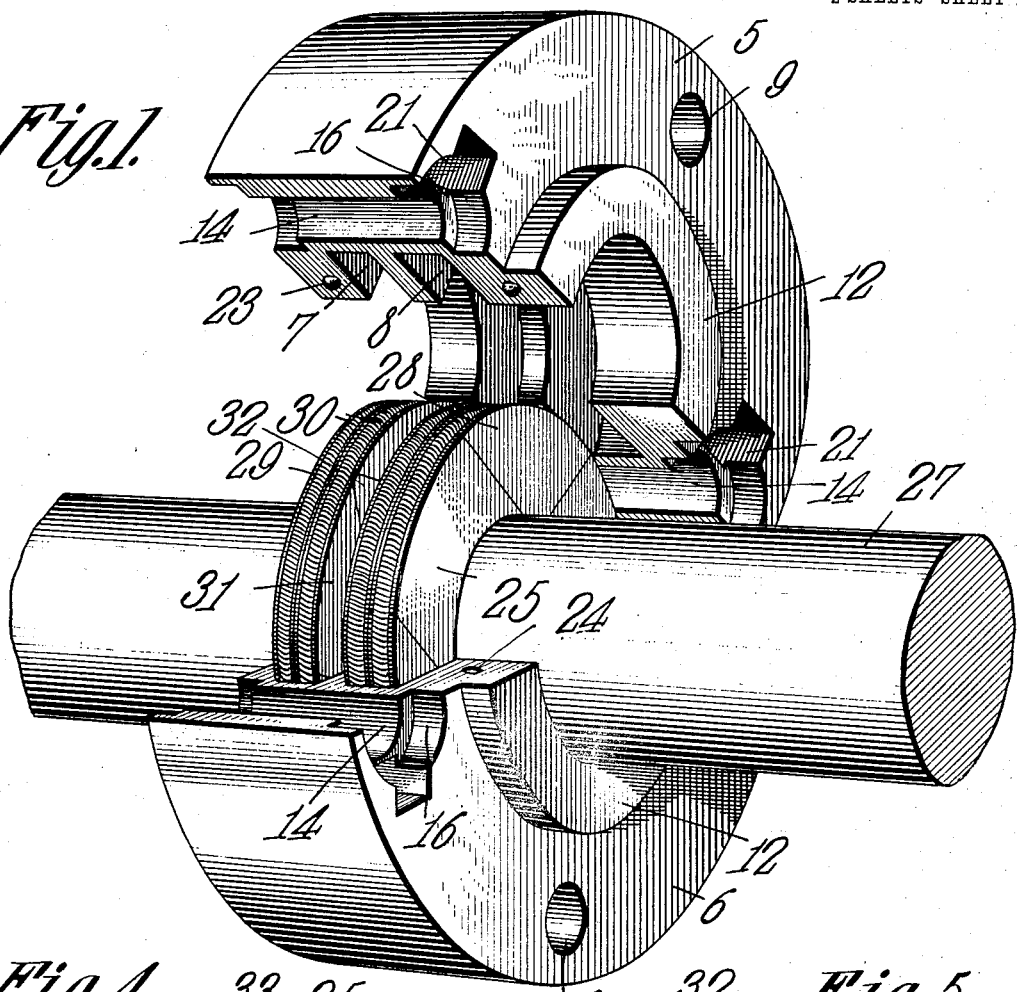
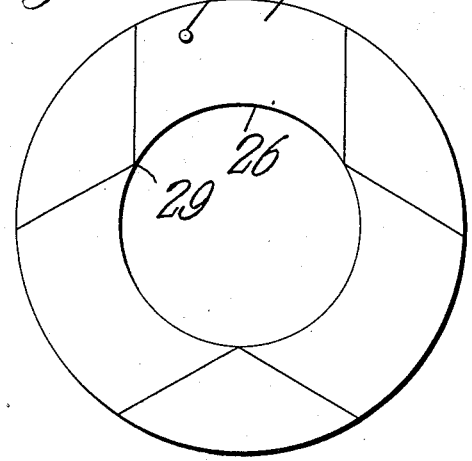
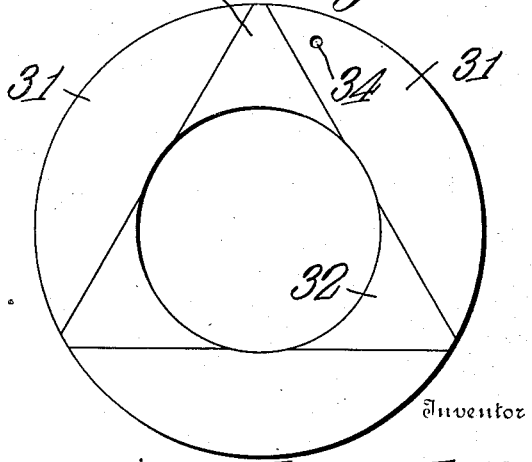

No. 896,287. PATENTED AUG. 18, 1908.
J. FELT.
ROD PACKING.
APPLICATION FILED MAY 23, 1908.
2 SHEETS—SHEET 2.
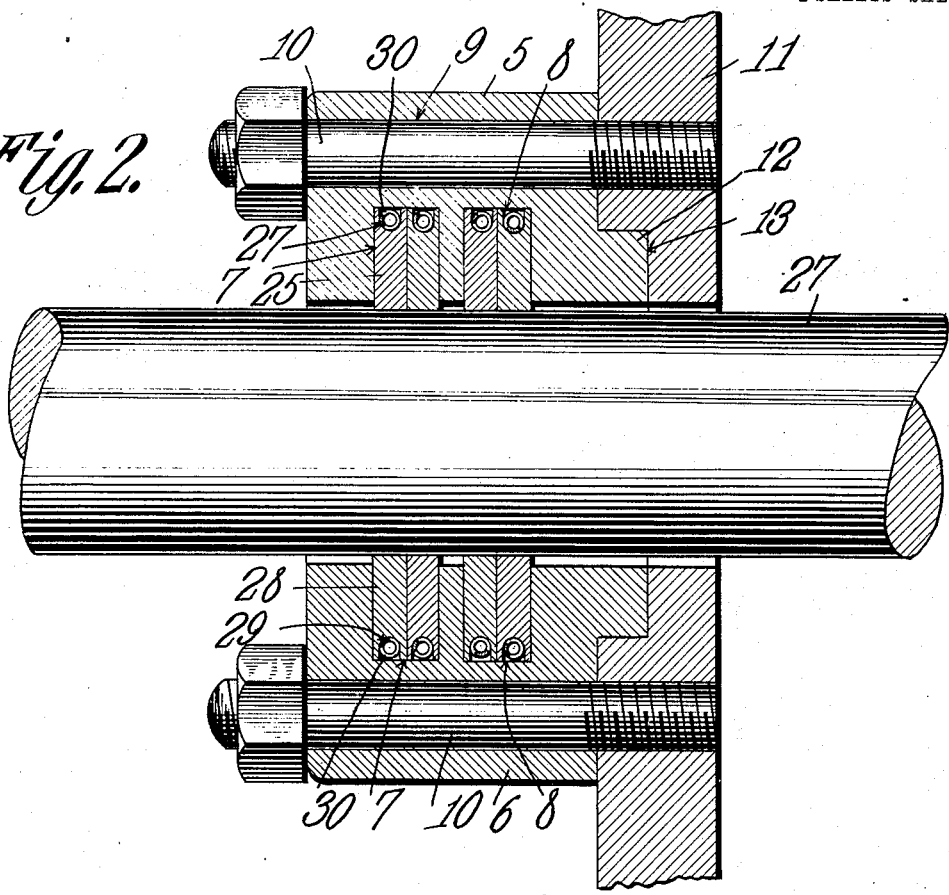
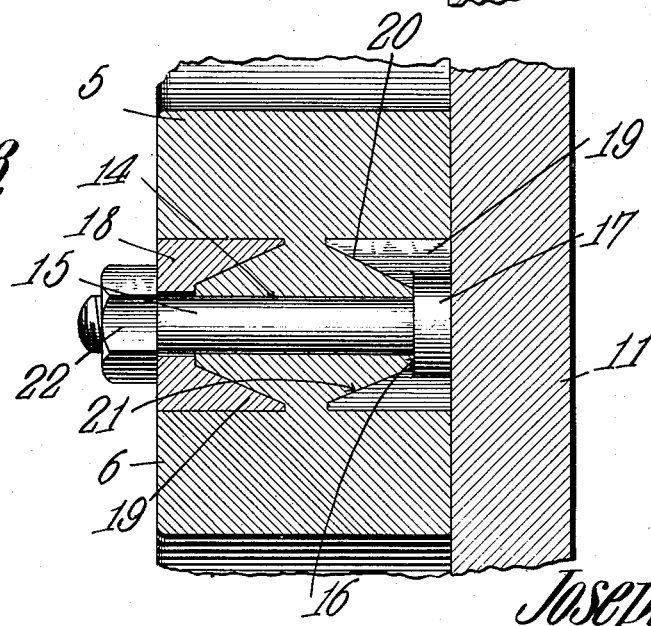
Witnesses
E. J. Stewart
S. N. Aiken
Inventor
Joseph Felt,
By C. A. Snow & Co.
Attorneys

UNITED STATES PATENT OFFICE.

JOSEPH FELT, OF LEAD, SOUTH DAKOTA.

ROD-PACKING.

No. 896,287.      Specification of Letters Patent.      Patented Aug. 18, 1908.

Application filed May 23, 1908. Serial No. 434,698.

*To all whom it may concern:*

Be it known that I, JOSEPH FELT, a citizen of the United States, residing at Lead, in the county of Lawrence and State of South Dakota, have invented a new and useful Rod-Packing, of which the following is a specification.

This invention relates to a metallic packing for steam engines, air compressors, refrigerator plants, steam pumps and the like and has for its object to provide a packing which will effectually prevent the escape of air, steam or other fluid along the piston rod.

A further object of the invention is to provide a packing ring, the construction and relative disposition of the several parts of which is such as to equalize and render uniform the pressure of the ring sections upon the piston rod.

A further object is to provide a packing ring, the sections of which will accommodate themselves to the surface of the rod as the latter wears.

A further object is to provide a sectional cage or housing for the reception of the packing rings, and further to provide improved means for clamping the sections of the cage in assembled position.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a rod packing constructed in accordance with my invention, the cage sections being separated to show the construction of the packing rings. Fig. 2 is a vertical sectional view showing the cage sections in assembled position. Fig. 3 is a detail sectional view showing the manner of clamping the cage sections in assembled position. Fig. 4 is a plan view of one of the packing rings of one set removed from the cage. Fig. 5 is a similar view showing the mating ring of said set.

Similar numerals of reference indicate corresponding parts in all of the figures of the drawings.

The improved packing forming the subject matter of the present invention is housed within a cylindrical cage or casing preferably formed in two sections 5 and 6, said sections being provided with interior seating chambers or grooves 7 and 8 adapted to register with each other when the cage sections are assembled to accommodate the packing rings.

Each cage section is pierced by a longitudinal opening 9 adapted to receive a bolt 10, which latter serves to secure the cage in position on the piston head 11 of a steam engine, air compressor or similar device.

Each cage section is also preferably formed with a segmental rib 12 which register, when the cage sections are assembled, to form an annular flange adapted to enter a correspondingly shaped seating groove 13 formed in the outer face of the cylinder head 11, as shown, thereby to assist in preventing accidental displacement of the cage.

Disposed at the juncture of the meeting faces of the cage sections 5 and 6 are grooves 14 adapted to receive suitable clamping devices preferably in the form of bolts 15, there being counter sunk portions or sockets 16 formed in the opposite faces of each cage section and communicating with the grooves 14, as shown, for the reception of the heads 17 and washers 18 of the clamping bolts.

The heads 17 and washers 18 are each provided with oppositely disposed lugs 19, the inner faces of which are inclined or beveled at 20 for engagement with the correspondingly inclined walls of depressions or recesses 21 formed in the cage sections and communicating with the socket 16 so that when the clamping nuts 22 are adjusted the inclined faces of the lugs will bear against the inclined walls of the recesses and thereby firmly clamp the cage sections in assembled position.

Suitable steel balls or pins 23 are also preferably embedded in the faces of one of the sections for engagement with correspondingly shaped seating recesses 24 formed in the adjacent faces of a mating section when said sections are assembled thereby to assist in preventing accidental separation of the cage sections The packing rings are preferably arranged in pairs or sets, one pair or set being disposed within each chamber of the carriage.

One of the packing rings of each set is formed of a plurality of segmental sections 25 preferably three in number, and each having its opposite ends disposed parallel and its inner or active face 26 curved to conform to and adapted to bear against the piston rod 27, there being wedge shaped filling blocks or sections 28 interposed between the sections 25 with the points 29 of the filling blocks disposed at the juncture of the parallel faces of each section 25, as best shown in Fig. 4 of the drawings.

The outer or peripheral edges of the sections 25 and 28 are formed with peripheral grooves 29 for the reception of a continuous coiled spring 30, which latter serves to normally and yieldably support the members 22 and 25 in engagement with the outer surface of the rod 27, thereby to effectually prevent leakage or escape of the fluid along the rod.

The mating ring of each set comprises a plurality of segmental members 31, between the adjacent faces of which are interposed substantially triangular shaped filling members or blocks 32 having their inner faces concaved for engagement with the piston rod 27, the inner faces of the segmental sections 31 being also slightly concaved to conform to the curvature of the piston rod, there being a spring, similar in construction to the spring 30, seated in the peripheral groove of the sections 31, and 32, as shown.

Attention is here called to the fact that the sections of one of the rings of each set are arranged to break joint with the sections of the mating ring of each set, a pin 33 being extended laterally from one of the sections 25 for engagement with a correspondingly shaped socket 34 in one of the sections 31 of the mating ring, thereby to properly position said rings and thus support the same so that the sections thereof will break joint, as before stated.

The sections or segments of the packing rings are preferably formed of Babbitt metal and said rings may be used in pairs or singly, as desired.

In assembling the parts the packing rings of each set are first positioned in their respective chambers in one of the cage sections after which the mating cage section is placed in position thereon and the bolts 15 extended through the grooves 14 with the wedge shaped lugs 19 seated in the adjacent recesses 21, after which the nuts 22 are adjusted thereby to clamp the sections around the rod and support or hold the packing rings in operative position relative to the piston rod.

From the foregoing description, it is thought that the construction and operation of the device will be readily understood by those skilled in the art and further description thereof is deemed unnecessary.

Having thus described the invention what is claimed is:

1. The combination with a movable rod, of a sectional cage surrounding the rod and provided with an interior chamber, a packing ring seated in said chamber, and a clamping device having wedge shaped members adapted to engage adjacent cage sections for drawing said cage sections together when the clamping device is adjusted.

2. The combination with a movable rod, of a sectional cage surrounding the rod and provided with an interior chamber, a packing ring seated in said chamber, and clamping devices disposed at the juncture of the cage sections and provided with wedge shaped members adapted to engage and draw the cage sections together when the clamping devices are adjusted.

3. The combination with a movable rod, of a sectional cage surrounding the rod and provided with an interior chamber, there being grooves formed in the adjacent faces of the cage sections, a packing ring seated in the chamber, threaded bolts seated in the grooves and provided with wedge shaped lugs adapted to engage the cage sections, and nuts engaging the threads on the bolts and bearing against the cage sections for clamping the same in assembled position.

4. The combination with a movable rod, of a sectional cage surrounding the rod and provided with an interior chamber, there being grooves formed in the mating faces of adjacent sections and sockets communicating with said grooves, clamping bolts seated in the grooves and each provided with a head for engagement with the adjacent socket, a washer carried by each bolt and seated in the opposite socket, wedge shaped lugs carried by the heads and washers, respectively, for engagement with the cage sections, a packing ring seated in the chamber, and nuts engaging the threads on the bolts for clamping the cage sections in assembled position.

5. The combination with a movable rod, of a sectional cage surrounding the rod and provided with an interior chamber, there being grooves formed in the mating faces of adjacent sections and recesses spaced from the grooves and having inclined walls, there being sockets formed in the sections and communicating with the grooves and recesses, respectively, a packing ring seated in the chamber, a pin extending from the face of one section and engaging a corresponding socket formed in the adjacent face of the mating section, clamping bolts seated in the grooves, heads secured to the clamping bolts and seated in the adjacent sockets, said heads being provided with wedge shaped lugs engaging the inclined walls of the adjacent recesses, washers surrounding the bolts and provided with corresponding heads having inclined lugs for engagement with the adjacent sockets and recesses, respectively, and clamping nuts engaging the threads on the bolts for drawing the cage sections together.

6. The combination with a movable rod, of a sectional cage surrounding the rod and provided with an interior chamber, co-acting packing rings seated in said chamber and each formed of a plurality of sections arranged side by side and disposed in contact with each other, a spring surrounding the sections of each ring for yieldably supporting the same in engagement with the rod, and clamping devices disposed at the juncture of the casing sections and having wedge shaped members adapted to engage said cage sections for locking the cage sections in assembled position.

7. The combination with a movable rod, of a cage surrounding the rod and provided with an interior chamber, co-acting packing rings seated in said chamber and each formed of a plurality of sections, some of the sections of one of the packing rings having their opposite edges disposed parallel with each other, wedge shaped filling sections interposed between the sections and bearing against said parallel edges, the sections of the other ring being disposed parallel with and arranged to bear against the sections of the first mentioned ring, and means for clamping the cage sections in position on the rod.

8. The combination with a movable rod, of a cage surrounding the rod and provided with spaced interior chambers, a plurality of pairs of packing rings disposed within the chambers, one of the packing rings of each pair being formed of segmental sections having oppositely disposed parallel edges and intermediate wedge shaped filling blocks, the mating ring of each pair being formed of a plurality of sections arranged to break joint with the sections comprising the first ring, and a pin extending from one of the sections of one ring and engaging a socket formed in one of the sections of a mating ring for supporting the sections of both rings in break joint order.

In testimony that I claim the foregoing as my own, I have hereto affixed my signature in the presence of two witnesses.

JOSEPH FELT.

Witnesses:
JAMES L. CURRAN,
J. W. CURRAN.